US 6,683,617 B1

(12) United States Patent
Naoi et al.

(10) Patent No.: US 6,683,617 B1
(45) Date of Patent: Jan. 27, 2004

(54) ANTIALIASING METHOD AND IMAGE PROCESSING APPARATUS USING SAME (75) Inventors: Junichi Naoi, Tokyo (JP); Seisuke Morioka, Tokyo (JP)

(73) Assignee: Sega Enterprises, Ltd. (JP)

( * ) Notice: Subject to any disclaimer, the term of this patent is extended or adjusted under 35 U.S.C. 154(b) by 548 days.

(21) Appl. No.: 09/584,967

(22) Filed: Jun. 2, 2000

(30) Foreign Application Priority Data

Jun. 17, 1999 (JP) ............................................ 11-171117

(51) Int. Cl.[7] .................................................. G09G 5/00
(52) U.S. Cl. ........................................ 345/613; 345/611
(58) Field of Search .............................. 345/613, 611, 345/614

(56) References Cited

U.S. PATENT DOCUMENTS 5,555,359 A    9/1996   Choi et al.
5,982,376 A  * 11/1999   Abe et al. .................... 345/613

FOREIGN PATENT DOCUMENTS

WO      WO91/14995        3/1991

* cited by examiner

Primary Examiner—Matthew Luu
(74) Attorney, Agent, or Firm—Dickstein Shapiro Morin & Oshinsky LLP (57) ABSTRACT Disclosed are an antialiasing method and an image processing apparatus using the same, capable of high-quality image display without any significant reduction in processing speed and without any significant increase in the apparatus scale. Pixel data contains information on a subpixel mask indicative of region which a polygon occupies within a pixel. Based on data sets consisting of the subpixel masks and color data contained in the pixel data, display colors are determined on a pixel-by-pixel basis.

19 Claims, 11 Drawing Sheets

Size of subpixel = 0.25 × (Size of pixel)

FIG. 15C PRIOR ART
IMAGE WITH ANTIALIASING

FIG. 15B PRIOR ART
IMAGE WITHOUT ANTIALIASING

FIG. 15A PRIOR ART
THEORETICALLY CORRECT GEOMETRY

ANTIALIASING METHOD AND IMAGE PROCESSING APPARATUS USING SAME

BACKGROUND OF THE INVENTION

1. Field of the Invention

The present invention relates generally to an antialiasing method and an image processing apparatus using the same, and more particularly to an antialiasing method capable of a high-quality image display without causing any significant reduction in processing speed and any increase in apparatus scale.

2. Description of the Related Arts

In recent image processing systems such as game machines making use of computer graphics, it is desired to enhance the virtual realities through high-quality and high-speed displays of graphics having three-dimensional coordinates, on a two-dimensional screen such as a CRT composed of a multiplicity of display elements (pixels).

In such image processing systems, graphics to be displayed in the three-dimensional space are regarded as accumulations of polygons (polygonal surfaces), so that use is made of attribute data (hereinafter, referred to as polygon data) possessed by the polygons to create and display final two-dimensional images.

The polygon data is typically polygon vertex data including three-dimensional coordinate values of each vertex in a predetermined three-dimensional space, vertex colors, texture mapping coordinate addresses, vertex transparencies, and vertex normal vectors, etc.

Figure 14:
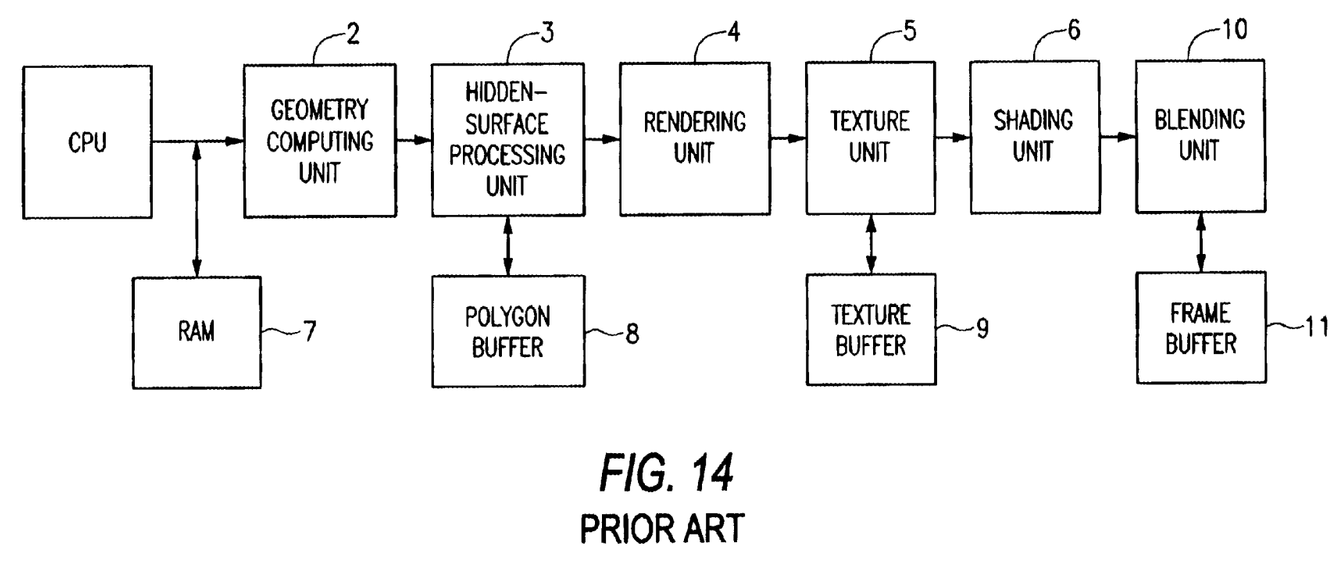
FIG. 14 is a schematic configuration block diagram of the image processing apparatus.

FIG. 14 illustrates a schematic configuration of the image processing system. Description will hereinbelow be made of a flow of typical processing effected to display images on the screen. In FIG. 14, a CPU 1 provides a control of entire functions of the image processing apparatus and performs a management of game sequences for example. A RAM 7 stores therein programs, data and display lists, etc, for use in the CPU 1.

The polygon data is fed to a geometry computing unit 2 in which it is subjected to processings such as coordinate transformation and perspective transformation, for the conversion into two-dimensional data corresponding to the display screen. The thus converted polygon data is stored in a polygon buffer 8.

A hidden-surface processing unit 3 then executes a hidden-surface removal (hereinafter, referred to as hidden-surface processing) by use of the polygon data. In cases where a plurality of polygons are superposed, one upon another, at the same site on the two-dimensional screen, it is necessary to judge which polygons are actually visible from the user's eyes. The hidden-surface processing makes such judgment to determine the range of each polygon to be displayed.

In response to the results of the hidden-surface processing, a rendering unit 4 then converts the polygon data into pixel based data. This processing is called rendering. For the data converted on a pixel-by-pixel basis (hereinafter referred to simply as pixel data), a texture unit 5 and a shading unit 6 execute texture mapping and shading processes, respectively. A texture buffer 9 stores therein texture data and provides data corresponding to the pixel texture mapping coordinate addresses, allowing texture mapping to be effected on a pixel-by-pixel basis.

Through these steps, determination of the pixel based data such as display colors is complete of each polygon. Using such data, a blending unit 10 defines finally the colors to be displayed on the screen, on a pixel-by-pixel basis. More specifically, in cases where for example a plurality of polygons share a single pixel (i.e., where the pixel includes plural pieces of valid pixel data) with pixels being translucent, the color data is produced from $\alpha$ values possessed by the respective pixels, to determine the final pixel display color.

The image data created on $\alpha$ pixel basis is written to the frame buffer 11. The frame buffer 11 feeds the data as frame images to a display unit for final display of the images.

Although images are displayed on the CRT or the like through the above processing steps, such digitized images represent the images in the form of the aggregate of pixels (the set of rectangles), intrinsically suffering from the problem of aliasing. This state is shown in FIGS. 15A to 15C.

Figure 15A:
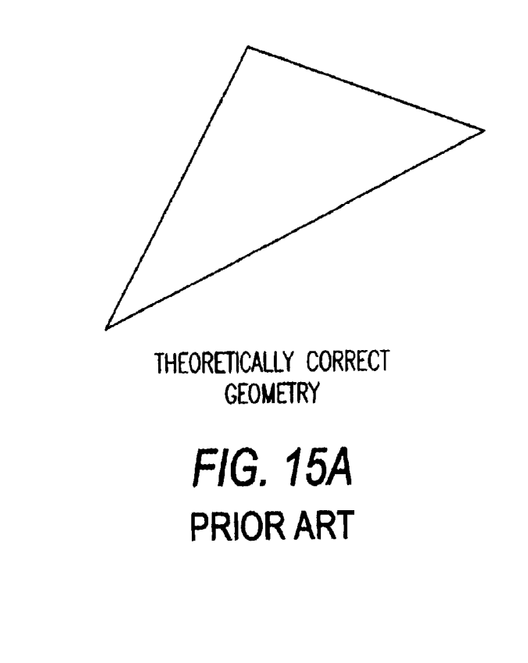
FIGS. 15A to 15C are diagrams for explaining the aliasing.
Figure 15B:
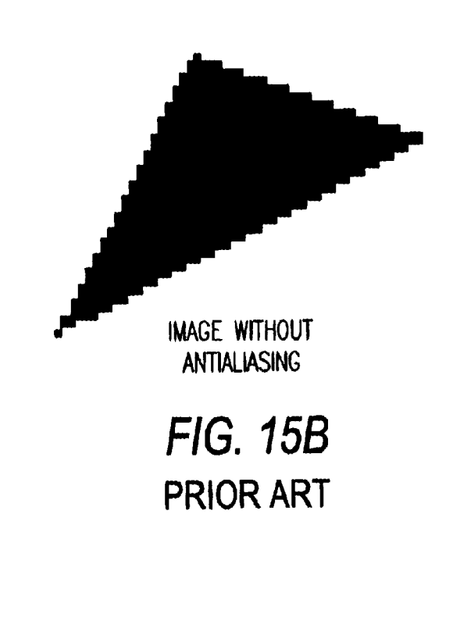
Figure 15C:
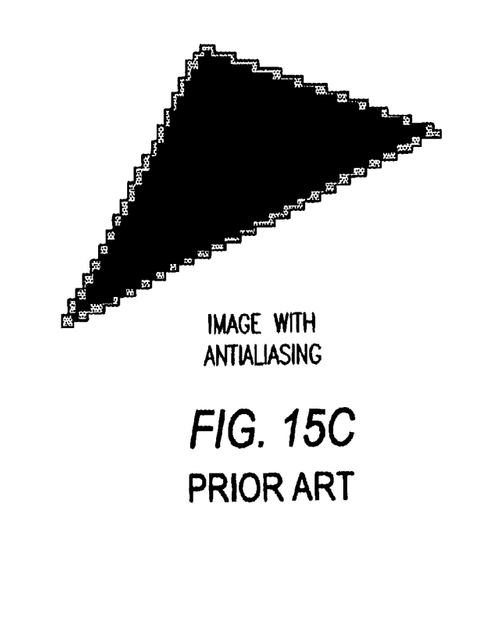

FIGS. 15A to 15C illustrate by way of example the case where a graphic of FIG. 15A is desired to represent. Even in the case of internally possessing information on a theoretically correct geometry as shown in FIG. 15A, once it is represented as the aggregate of pixels, diagonal lines such as the triangular polygon edges for example may result in a stepwise display as indicated in FIG. 15B. This is due to the fact that a single color is used to represent the entire pixel within which the color may internally (theoretically) vary. This is a problem intrinsically difficult to solve as long as the digital images are represented as the aggregates of pixels.

In particular, in cases where without taking any measures thereagainst, the color possessed internally by a representative point (e.g., a pixel center) within a pixel is regarded as the pixel color for processing as in the prior art, the above stepwise display will become remarkable.

Such a problem could however be solved to a substantially (visually) negligible extent by combining plural pieces of color data originally internally possessed by a pixel to determine the display color of that pixel. The processing therefor is called antialiasing. The graphic of FIG. 15C is an example of the display image obtained when subjected to the antialiasing processing.

It is one key function for the creation of highly realistic, high-quality images to execute such antialiasing processing.

This means that the antialiasing processing is indispensable for any image processing systems such as game machines since it ensures high-quality images in a pseudo-manner without using any high-resolution monitor.

For the determination of one pixel color in the antialiasing processing, however, it is necessary to generate information on a plurality of colors associated with the pixel and information on positions of those colors within the pixel and to make a certain calculation by use of them. For this reason, the antialiasing processing has hitherto been regarded as generally heavy processing, inevitably bringing about any increase in the processing time and system scale for the acquisition of high-quality images.

In order to alleviate such a drawback, a variety of measures have been adopted, although all the measures are not free from any deficiencies. The translucent edge technique commonly used in, e.g., personal computers is a color synthesizing technique in which transparency is determined depending on the proportions of the area occupied by polygons in a pixel within which polygon edges lie.

Although this technique is advantages in terms of the processing speed and system scale, it is problematic from the viewpoint of quality since the picture may often break or background colors may remain left. This arises from the fact that all the polygons are treated as translucent at their edge portions, so that the edge portions are not to be subjected to correct hidden-surface processing in the hidden-surface processing unit 3 described above.

An alternative conventional technique is an oversampling method. In this technique, processing is, made at a higher resolution than a display resolution on the screen and averaging is made immediately before the display, to obtain the display resolution. More specifically, this is a method in which the entire process steps up to the frame buffer 11 described above are executed on the basis of a smaller rectangle (subpixel) than the pixel size to be displayed.

This method is advantageous in that with its simple concept, the above-described standard processing steps need not substantially be changed and that a fairly high-quality is expected, although the amount of data to be processed increases in proportion to the number of subpixels, resulting in an increase in processing time and in system dimensions.

Some other methods than the above-described techniques have also been conceived, but none of them have presented well-balanced results in terms of the processing speed, image qualities, and system scale insofar as the game systems are practical.

SUMMARY OF THE INVENTION

It is therefore the object of the present invention to provide, in view of the above problems, an antialiasing method and an image processing apparatus using the same, capable of a high-quality image display without any significant reduction in processing speed or any significant increase in the apparatus scale.

In order to achieve the above object, a first aspect of the present invention provides an antialiasing method in which pixel data is caused to contain information on a subpixel mask indicative of region occupied by a polygon in a pixel and in which a display color is determined on a pixel-by-pixel basis, from data sets consisting of the subpixel masks and color data contained in the pixel data. According to the present invention, therefore, it is possible to implement subpixel based, high-quality antialiasing processing.

In a preferred mode of the present invention, the above pixel-based determination of display colors may be executed by combining a plurality of data sets consisting of color data and subpixel masks with one another, the number of data sets being less than the number of subpixels constituting one pixel.

In another mode, plural pieces of color data and a plurality of subpixel masks for determination of the display colors may be obtained by iterating predetermined processing for the color data and the subpixel masks until the pixel data valid for the subject pixel becomes absent.

In a further mode, the subpixel masks may be created through a hidden-surface processing step which includes, for each of scanning lines constituting the display screen, sorting a plurality of polygons whose edges intersect each scanning line, based on specific positions of said polygons in X-axis direction of the scanning lines, and further sorting the sorted polygons on the basis of Z-coordinate values of the polygons, the hidden-surface processing being performed on a subpixel-by-subpixel basis, and through a step of making the results of said hidden-surface processing into a pixel-by-pixel basis.

In order to attain the above object, a second aspect of the present invention provides an image processing apparatus comprising a subpixel mask creating unit for creating subpixel masks to add information thereof to pixel data; and a blending unit for processing data sets consisting of the subpixel masks and color data contained in the pixel data, to determine a display color on a pixel-by-pixel basis. According to the present invention, therefore, it is possible to implement subpixel based, high-quality antialiasing processing.

In a preferred mode of the present invention, the image processing apparatus may comprise color buffers and mask buffers, the number of both of which is less than the number of subpixels constituting one pixel.

In another mode, the subpixel mask creating unit may comprise a hidden-surface processing unit for performing hidden-surface processing on a subpixel-by-subpixel basis, the hidden-surface processing including, for each of scanning lines constituting said display screen, sorting a plurality of polygons whose edges intersect each scanning line, based on specific positions of the polygons in X-axis direction of the scanning lines, and further sorting the sorted polygons on the basis of Z-coordinate values of the polygons; and a rendering unit for making the results of processing effected by the hidden-surface processing unit into a pixel based data.

In a further mode, the hidden-surface processing unit may comprise Y sorters, a subline segmenting unit, X sorters the number of which is equal to the number of sublines lying within one scanning line, and Z sorters the number of which is equal to the number of the X-sorters. The rendering unit may comprise a subline queuing/pixel making unit.

The above and other objects, aspects, features and advantages of the present invention will become more apparent from the following detailed description of a preferred embodiment thereof.

DESCRIPTION OF THE PREFERRED EMBODIMENT

The present invention will now be described with reference to the accompanying drawings which illustrate preferred embodiments thereof in a technically non-limitative manner and in which like reference numerals or symbols designate like or corresponding parts throughout several views.

Reference is made again to FIG. 14 in the following description since overall major processing steps effected by an image processing apparatus in accordance with the present invention are the same as in the prior art. Description of other steps than those featuring the present invention will be omitted because they are substantially the same as in the above description of the prior art.

In FIG. 14, the image processing apparatus according to the present invention is characterized by the hidden-surface processing unit 3 and the rendering unit 4, as well as the blending unit 10. The hidden-surface processing and rendering parts providing a first feature will hereinafter be described.

Figure 1:
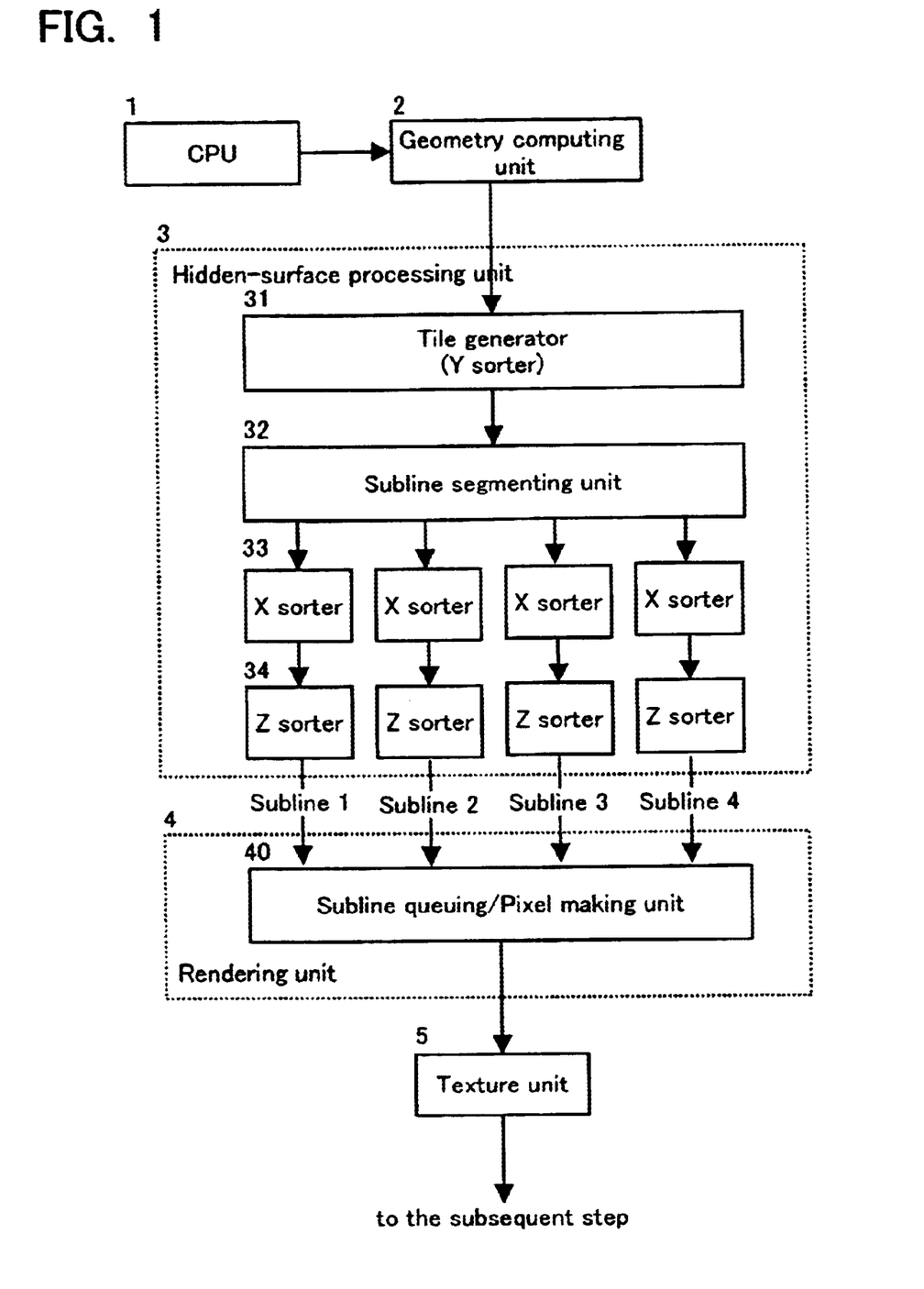
FIG. 1 is a block diagram of a hidden-surface processing unit and rendering unit of an image processing apparatus in accordance with an embodiment of the present invention.

FIG. 1 is a block diagram for explaining the hidden-surface processing unit 3 and the rendering unit 4 of the apparatus shown in FIG. 14. In the conventional manner, polygon data is converted by the geometry computing unit 2 into a two-dimensional space, which in turn is fed to the hidden-surface processing unit 3.

Although the hidden-surface processing is performed therein, this apparatus employs as a polygon sorting method required for the hidden-surface processing a scanning-line three-dimensional sorting method as described in Japanese Patent Application Laid-Open No. H10-132106 filed priorly by the present inventors.

Such a sorting method is outlined as follows. First, for each scanning line on a display screen there is created a list of polygons lying on the scanning line so that the ranges (right and left edges) of existence of the polygons on the scanning line are figured out from intersections of polygon edges and the scanning line. Then, based on the results, for each scanning line, the thus listed polygons are sorted in X-axis direction using a specific position of a polygon as the reference. Furthermore, in the sorted order, right and left edges of the polygons and Z-coordinate values (distances from eyes) are fetched for comparison, and the polygons to be displayed and their ranges (display sites) are determined in sequence in X-axis direction, which are then fed to the subsequent step. In this manner, the scanning-line three-dimensional sorting method is a method in which the hidden-surface processing is executed for each scanning line to determine the display sites in sequence.

According to this method, pixel-based information can be processed on a scanning line basis to create images, so that the processing can be done at a higher speed in spite of its good qualities, making it possible to further reduce the size of the frame buffer (the frame buffer 11 of FIG. 14).

This apparatus is characterized in that the hidden-surface processing using the scanning-line three-dimensional sorting method is performed on a subpixel basis so that subpixel masks can effectively be created for each polygon pixel. The subpixel masks created herein are used in the blending processing effected by the blending unit 10 which will be described later, making subpixel based antialiasing feasible.

As can be seen in FIG. 1, the hidden-surface processing unit 3 and the rendering unit 4 comprise a tile generator (Y sorter) 31, a subline segmenting unit 32, X sorters 33, Z sorters 34 and a subline queuing/pixel making unit 40. This apparatus uses a 4×4 subpixel by way of example. FIGS. 2 to 6 are diagrams for explaining the contents of processing in this step.

For the polygon data converted into the two-dimensional space by the geometry computing unit 2, the tile generator (Y sorter) 31 first executes Y-sort processing based on the scanning-line three-dimensional sorting method. This processing is a process in which for listing, a polygon is segmented for each scanning line (line displayed on the display screen).

Figure 2:
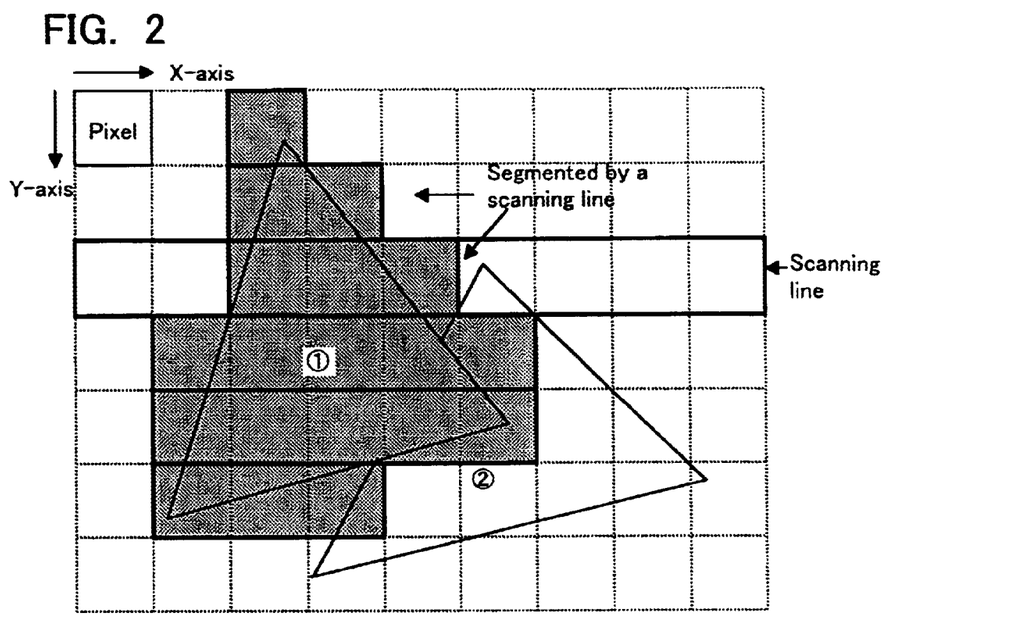
FIG. 2 illustrates display images of polygons ① and ② by way of example, for the explanation of Y-sorting.

FIG. 2 illustrates an example of the case where two polygons ① and ② are present in an overlapped manner, with the polygon ① being line segmented by a scanning line. The line segmentation of the polygon ① is not shown in the diagram. At this stage, each polygon is merely segmented without taking into consideration the context between the two polygons overlapping with each other on the screen.

Figure 3:
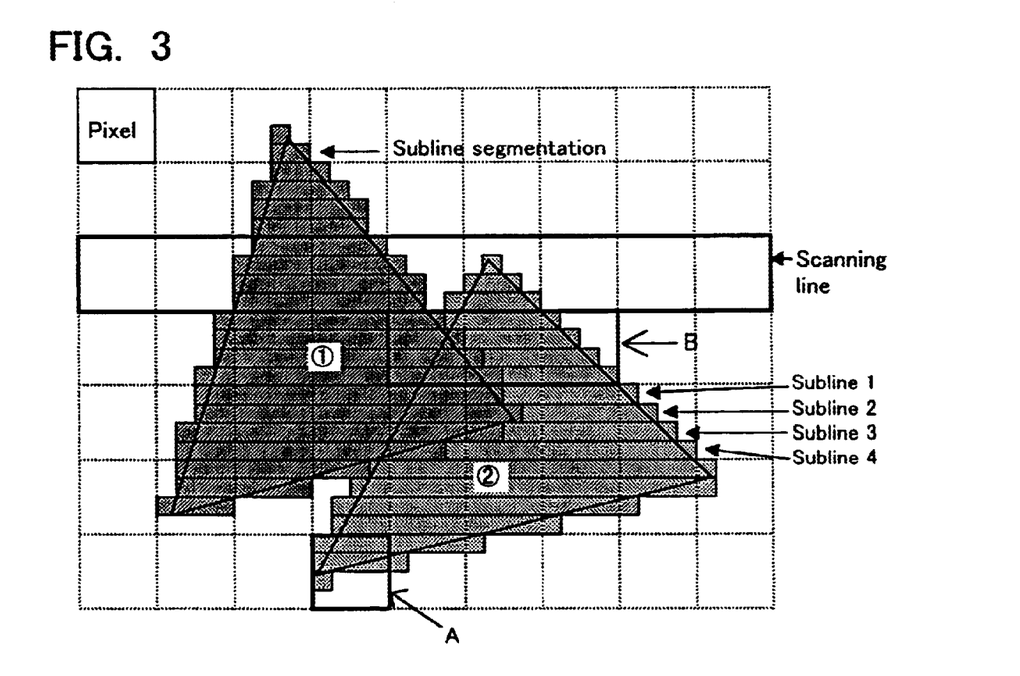
FIG. 3 is a diagram for explaining a subline segmentation and Z-sorting.

The subline segmenting unit 32 then performs a further segmentation of the thus line segmented polygon data by use of sublines. FIG. 3 depicts the state of the subline segmentations. Since this example assumes a subpixel which is a fourth the size of the pixel, the polygon is segmented by sublines (sublines 1 to 4 in FIG. 3) quadrisecting the scanning line in the height direction of the pixel.

At this stage, the context between the two overlapping polygons has not yet been determined. Thus, the portion where the polygon ① overlaps with the polygon ② in the diagram also includes a region of the subline segmented polygon ②. In FIG. 3, this portion is represented as the result of Z sorting which will be described later.

The subline segmented polygon data is subjected to X sorting by four X sorters 33 which are arranged in parallel for simultaneous processing of the sublines 1 to 4. The X sorting is a process in which polygons lying on a subline are sorted on the basis of their positions in X-axis direction such that positional relationships between adjacent polygons, especially the state of overlapping can be made definite.

Figure 4:
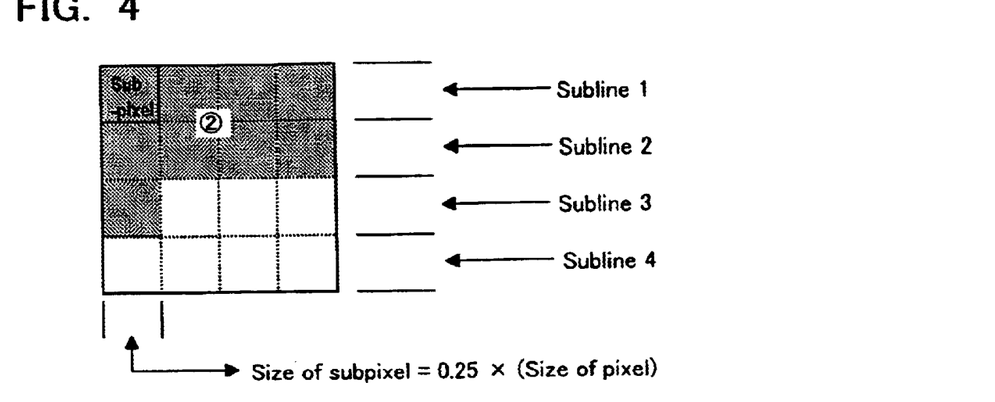
FIG. 4 is an enlarge view of a section A of FIG. 3, for the explanation of subpixels.

The method of sorting is substantially the same as the conventional scanning-line three-dimensional sorting method. Although use is made of an X value (coordinate) at the left-hand end of each polygon, the X value is represented in 0.25 pixels since the X value uses as its unit the subpixels, i.e., 4×4 subpixels as described earlier. FIG. 4 is an enlarged view of an area A of FIG. 3, showing the state of the interior of one pixel.

Then the Z sorters 34 perform Z sorting processes in parallel on a four-subline basis. The Z sorting is a process in which polygons occupying the same region are sorted by the distance (Z value) from eyes to determine the sites to be displayed on the display screen and the order of display.

Figure 5A:
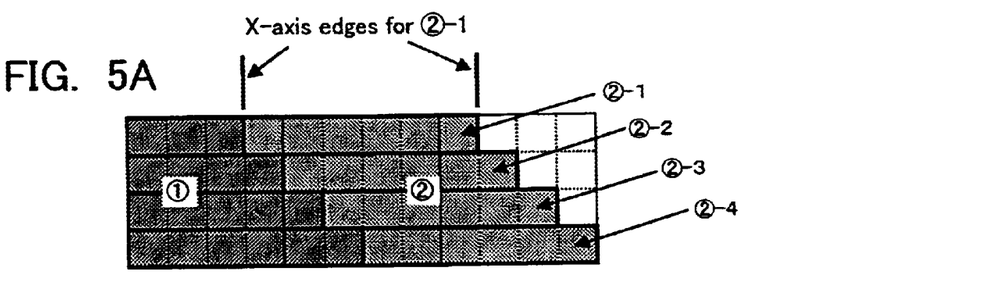
FIGS. 5A and 5B are enlarged views of a section B of FIG. 3, for the explanation of the hidden-surface processing on a subpixel-by-subpixel basis.

This process is also substantially the same as the conventional scanning-line three-dimensional sorting method. The X sorted subline segmented polygons are sorted by Z values, while simultaneously X-axis edges of display sites are outputted. In this case as well, the X-axis edges are represented on a subpixel basis. FIG. 3 illustrates the results of processing of the polygons ① and ②. FIG. 5A is an enlarged view of an area B of FIG. 3, showing the results of processing for a three-pixel range by way of example. The subpixel based hidden-surface processing has thus been completed.

Figure 5B:
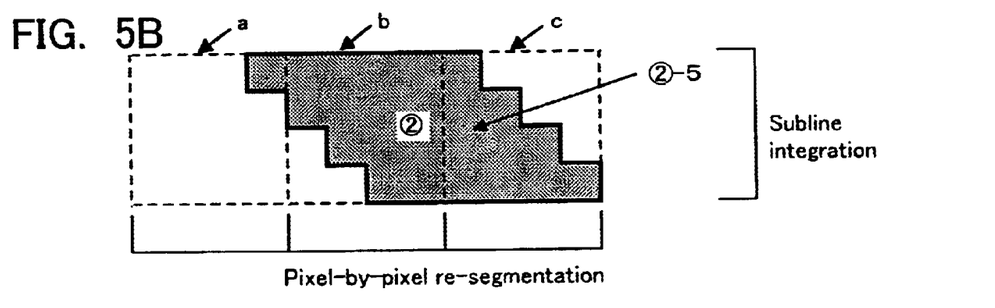

Then in the subline queuing/pixel making processing unit 40, display site data output for each subline is integrated for each same polygon, and the data is integrated for four sublines contained in a single scanning line. FIG. 5B illustrates the result of integration of the polygon ② of FIG. 5A by way of example. Display sites ②-1 to ②-4 for each subline of the polygon ② shown in FIG. 5A are integrated into a display site ②-5 of FIG. 5B.

Then the result is again segmented by the pixel in X-axis direction, on the basis of which result the polygon data is converted into pixel based data (pixel data) for the output. In FIG. 5B, the display site ②-5 is segmented into pixels a, b and c so that each pixel contains any display site of the polygon ②, whereby it is possible to acquire information that the polygon ② is present in all of the pixels a, b and c. Based on the thus acquired information, the polygon data of the polygon ② is converted into pixel based data (pixel data) for the output.

Furthermore, as a result of the processing of pixel-by-pixel re-segmentation, the region which the polygon display sites occupy in a pixel is made apparent on a subpixel basis. It can be seen in FIG. 5B that the pixels a, b and c each contain a portion where the polygon ② is to be displayed. The subpixel mask refers to information represented by the subpixel, of a region which the display site of each polygon occupies in one pixel. This information is created simultaneously by the subline queuing/pixel making unit 40. The thus created subpixel mask is added as an attribute to the pixel based data (pixel data) acquired by use of the result of pixel-by-pixel re-segmentation, which are both provided as outputs together.

Figure 6A:
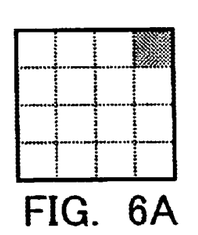
FIGS. 6A to 6C illustrate an example of a subpixel mask.
Figure 6B:
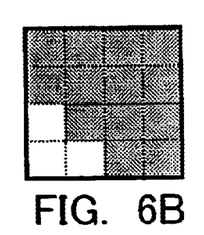
Figure 6C:
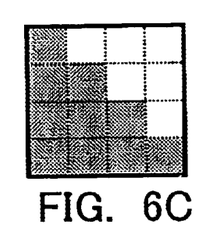

In case of the example of FIG. 5B, subpixel masks A, B and C of the polygon ② are created as shown in FIGS. 6A to 6C, respectively, for each of the pixels a, b and c. Each pixel based polygon data (pixel data) containing the subpixel masks created herein is fed to the subsequent step (a texture unit 5 of FIG. 1 or FIG. 14).

Although the subpixel masks required for the antialiasing are created using the above-described method, use of the scanning-line three-dimensional sorting method for the hidden-surface processing can prevent the processing speed from lowering in spite of its subpixel based, finer unit of processing in X-axis direction. In Y-axis direction, on the other hand, this embodiment has employed four-circuit parallel processing since there is a need for an increase of the apparatus scale or processing time corresponding to the degree of fineness of the unit of processing.

In case of executing the 4×4 subpixel based hidden-surface processing for use in this embodiment, four-times apparatus scale is sufficient to implement this embodiment although the conventional method needs 16-times processing time or apparatus scale, contributing to an effective antialiasing. In the event of antialiasing placing a disproportionate emphasis on X-axis direction depending on the contents of images to be displayed (in case of using, e.g., 8×4 subpixels), this embodiment provides a more effective method.

Description will then be made of the blending unit 10 providing a second feature.

After the completion of the rendering process described above, pixel-by-pixel converted data is subjected by the texture unit 5 and a shading unit 6 of FIG. 14 to texture mapping and shading processes each on a pixel basis. Each polygon color is determined for each pixel. Information (pixel data) containing color data and subpixel masks corresponding to the color data of each polygon for each pixel is fed to the block of the blending unit 10.

The blending circuit of this apparatus makes use of the subpixel masks created in the steps of hidden-surface process and rendering and performs the process by means of color buffers and processing circuits, the number of both being less than the number of subpixels, thereby achieving an effective, high-quality antialiasing.

Figure 7:
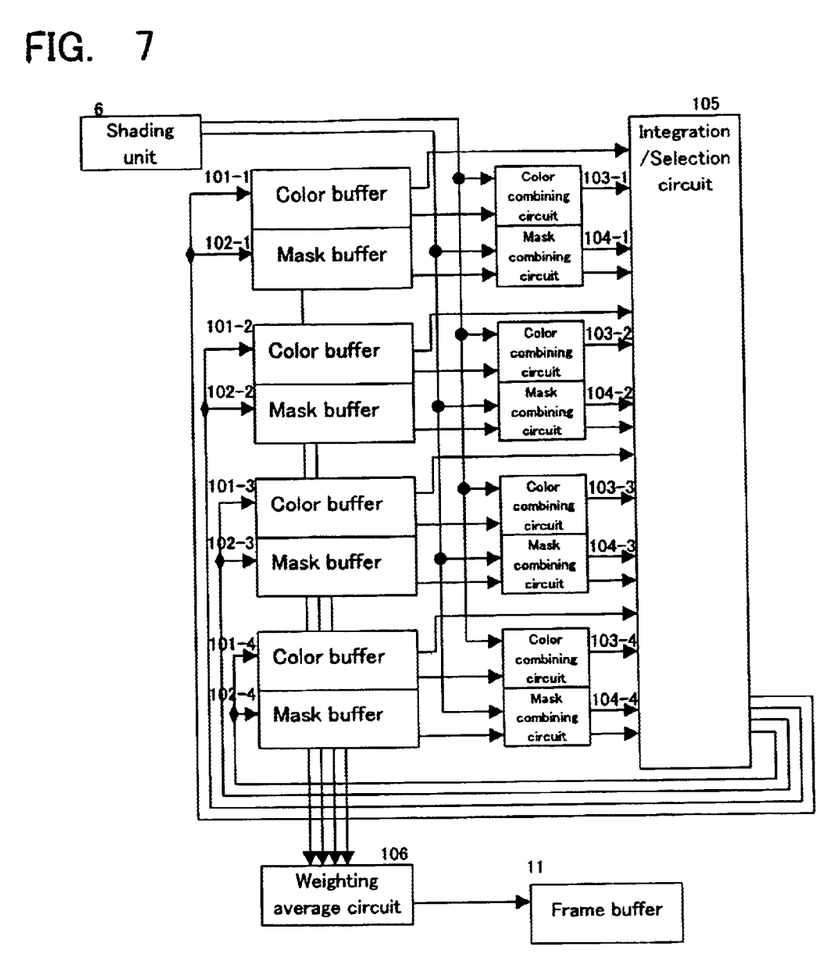
FIG. 7 is a block diagram of a blending unit of the image processing apparatus in accordance with the embodiment of the present invention.
Figure 8A:
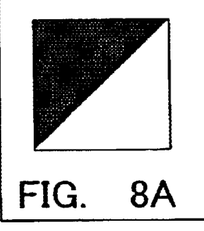
FIGS. 8A to 8D are diagrams for explaining logical operations effected by a mask combining circuit of FIG. 7.
Figure 8B:
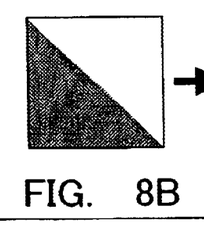
Figure 8C:
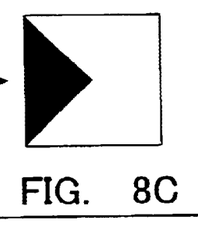
Figure 8D:
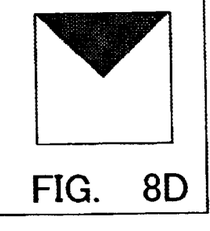

FIG. 7 is a block diagram of the blending unit 10 of this apparatus. This block comprises four color buffers 101-1 to 101-4, four mask buffers 102-1 to 102-4, four color combining circuits 103-1 to 103-4, four mask combining circuits 104-1 to 104-4, an integration/selection circuit 105 and a weighting average circuit 106.

Figure 9:
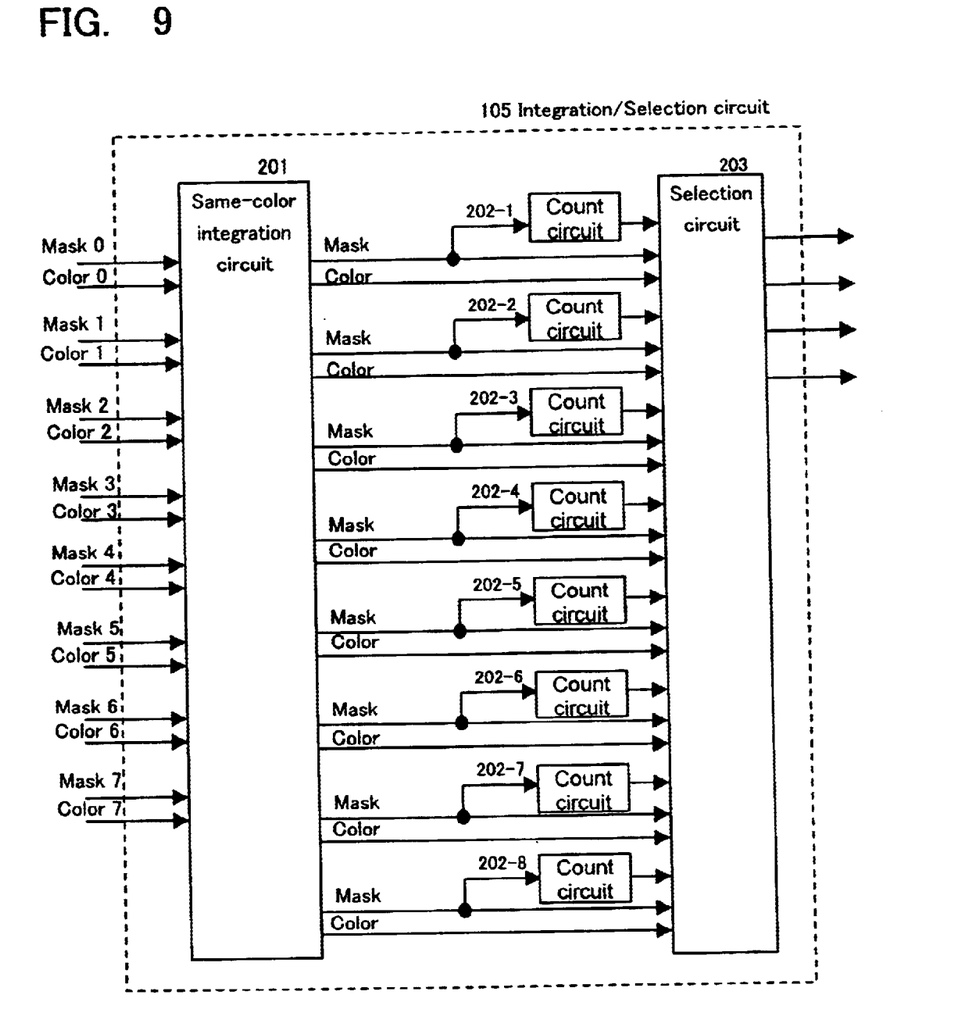
FIG. 9 is a block diagram of the interior of an integration/selection circuit of FIG. 7.
Figure 10:
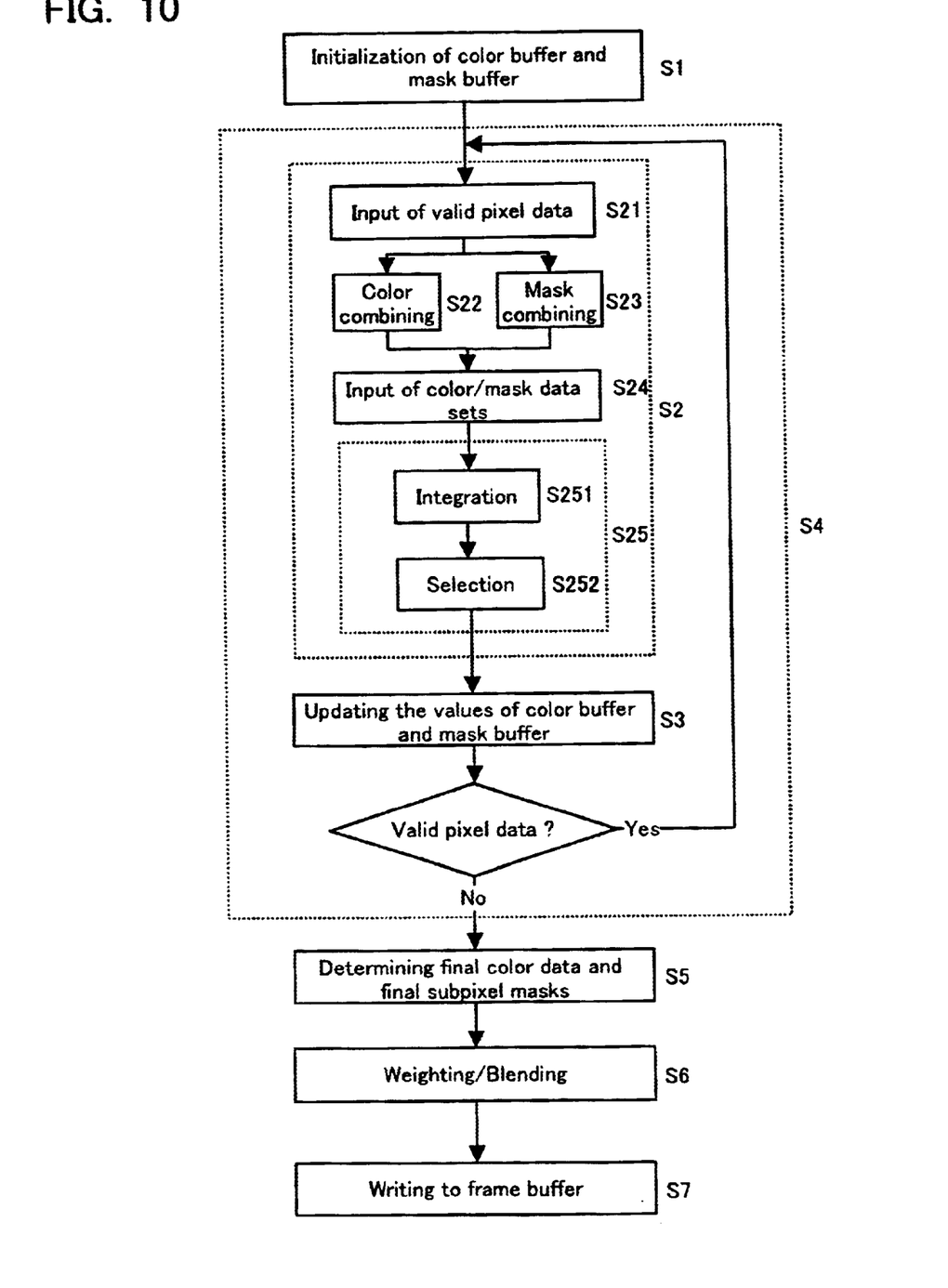
FIG. 10 is a flowchart showing operations of the blending unit of the image processing apparatus in accordance with the embodiment of the present invention.
Figure 11:
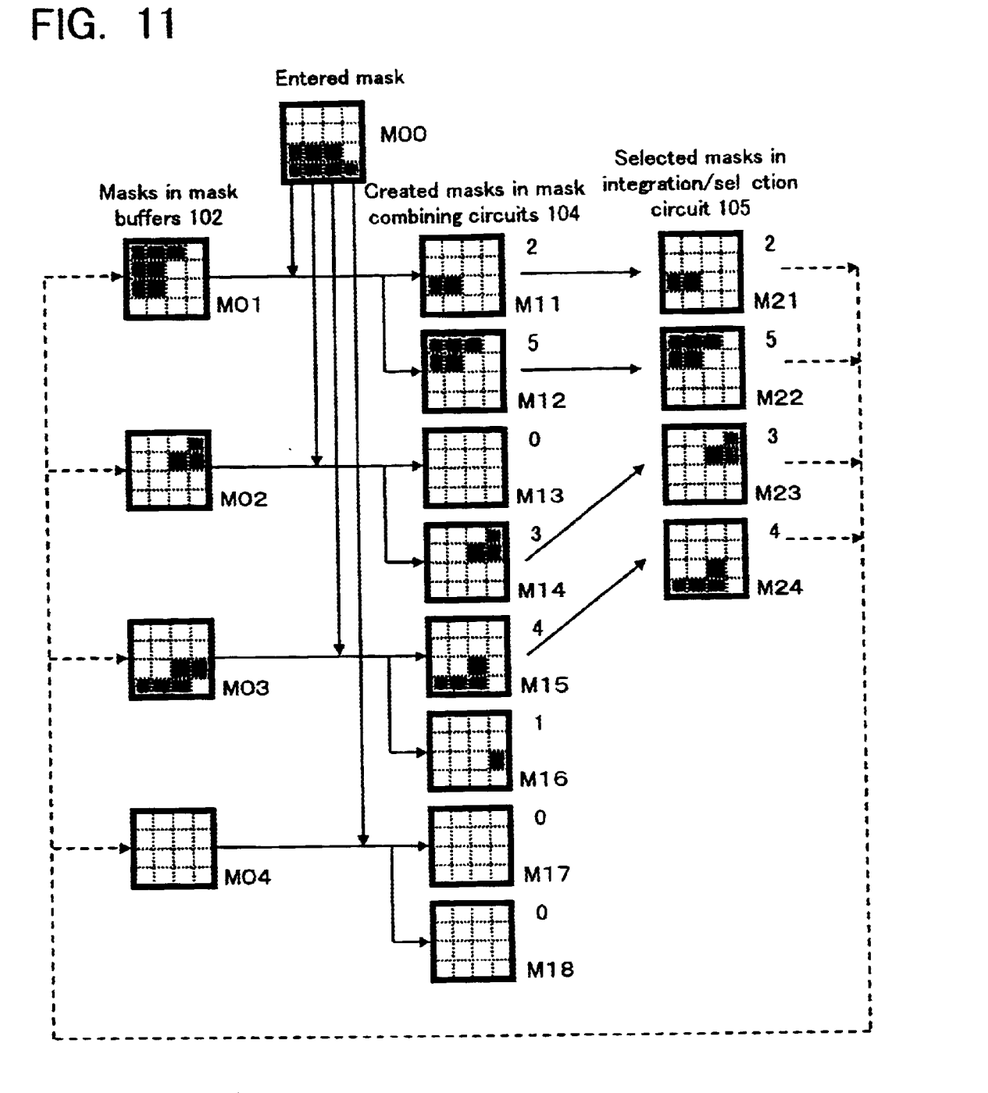
FIG. 11 illustrates by way of example the subpixel mask processing step effected by the blending unit.

Referring to FIGS. 8 to 11 in conjunction with FIG. 7, functions and operations of circuits of this blending unit will be described hereinbelow. FIG. 8 is a diagram for explaining logic operations effected by the mask combining circuits 104-1 to 104-4, and FIG. 9 is a block diagram of the interior of the integration/selection circuit 105. FIG. 10 is a flowchart showing actions of this blending unit, and FIG. 11 is a diagram exemplarily showing steps for processing the subpixel masks.

The color buffers 101-1 to 101-4 are buffers for storing pixel color data, with colors being represented by parameters R, G, B, ar, ag and ab (red, green, blue and their respective transparencies). The number of these buffers is equal to the number of the polygon edges capable of coexisting within a single pixel (the number of polygons whose edges are present within a single pixel). In other words, the final pixel color is determined by combining a corresponding number of pieces of color data to the number of the buffers. Since this apparatus comprises the four color buffers, the pixel color is produced by combining four pieces of color data.

At the initial stage of each pixel processing, all of four color data values stored in the color buffers 101-1 to 101-4 are initialized to ar=1.0, ag=1.0 and ab=1.0, with R, G and B of any arbitrary values (step S1 of FIG. 10). Afterwards, every time one piece of pixel data is entered into this blending unit, they are substituted by four color data values output from the integration/selection circuit 105 which will be described later (step S3 of FIG. 10).

When any valid pixel data has eventually become absent for that pixel, the four pieces of color data stored in the color buffers 101-1 to 101-4 are fed to the weighting average circuit 106. This color data results in four pieces of color data for determining the final pixel colors (step S5 of FIG. 10).

The mask buffers 102-1 to 102-4 are buffers for storing the subpixel masks and correspond to the color buffers 101-1 to 101-4, respectively. The subpixel masks stored therein indicate at all times regions where the colors stored in the corresponding color buffers 101-1 to 101-4 occupy within a pixel. Thus, this apparatus is provided with four mask buffers.

At the initial stage of each pixel processing, values of the subpixel masks stored in the mask buffers 102-1 are initialized to 0xffff (where all values of 16 subpixels lying within one pixel are "1"), but all values of the subpixel masks stored in the other mask buffers 102-2 to 102-4 are initialized to 0x0000 (where all values of 16 subpixels lying within one pixel are "0") (step S1 of FIG. 10). Afterwards, in the same manner as the case of the color buffers described above, every time one piece of pixel data is entered into this blending unit, they are substituted by four subpixel mask values output from the integration/selection circuit 105 which will be described later (step S3 of FIG. 10).

When any valid pixel data has eventually become absent for that pixel, the four subpixel masks stored in the mask buffers 102-1 to 102-4 are fed to the weighting average circuit 106 in such a manner as to correspond to four pieces of color data stored finally in the color buffers 101-1 to 101-4. These four subpixel masks are used for the weighting of the four pieces of color data to determine the final pixel colors described above (step S5 of FIG. 10).

Then in FIG. 7, the part composed of the color combining circuits 103-1 to 103-4, the mask combining circuits 104-1 to 104-4 and the integration/selection circuit 105 executes the processings of combining, integration and selection for four color data and subpixel mask sets stored in the color buffers 101-1 to 101-4 and the mask buffers 102-1 to 102-4 and for one piece of pixel data (a set of color data and subpixel mask), to newly create four color data and subpixel mask sets (step S2 of FIG. 10).

Among them, the color combining circuits 103-1 to 103-4 are circuits for making a translucent combining from color data values stored in the color buffers 101-1 to 101-4 and from color data values of pixel data entered. In the four color combining circuits 103-1 to 103-4 there are executed four combining processes between each of the four pieces of color data stored in the color buffers 101-1 to 101-4 and the color data entered, with the result that new four pieces of color data is created and fed to the integration/selection circuit 105 (steps S21 and S22 of FIG. 10).

The mask combining circuits 104-1 to 104-4 are circuits for making a creation of new subpixel masks from the subpixel masks stored in the mask buffers 102-1 to 102-4 and from the subpixel masks entered. In the four mask combining circuits 104-1 to 104-4 there are executed logic operations which will be described below between each of the four subpixel masks stored in the mask buffers 102-1 to 102-4 and the subpixel masks entered, thereby allowing one circuit to create two new subpixel masks. As a result of this, a total of eight new subpixel masks are fed to the integration/selection circuit 105 (steps S21 and S23 of FIG. 10).

Referring to FIGS. 8 and 11, description will be made of the above logic operations effected by the mask combining circuits 104-1 to 104-4. The logical operations effected herein include as shown in FIG. 8 executing the bitwise logical and ((c) in the diagram) between a subpixel mask ((a) in the diagram) stored in the mask buffers 102-1 to 102-4 and a subpixel mask ((b) in the diagram) entered and include executing the bitwise logical and ((d) in the diagram) between a subpixel mask stored in the mask buffers 102-1 to 102-4 and an inverted mask for the subpixel mask entered, to consequently create two new subpixel masks ((c) and (d) in the diagram).

A first one of the thus created two subpixels represents a region (hereinafter, referred to as a blended mask) where the color of the color buffers 101-1 to 101-4 is blended with entered color, while a second one thereof represents a region (hereinafter, referred to as a unblended mask) where the color of the color buffers 101-1 to 101-4 remains unblended.

FIG. 11 illustrates an example of the processing effected by this blending unit when notice is taken of the subpixel masks. This example assumes a condition where four subpixel masks M01 to M04 are stored in the mask buffers 102-1 to 102-4, with the subpixel mask M00 entered. From the upper left portion of the diagram, there can be seen that the mask combining circuit 104-1 makes the above-described logic operation between the subpixel mask M01 of the mask buffer 102-1 and the entered subpixel mask M00, with the result that two subpixel masks M11 and M12 are created. Then, downward there are exemplified the states where four circuits eventually generate a total of eight subpixel masks M11 to M18.

The thus created four blended masks are paired with four pieces of new color data created by the color combining circuit 103 while the four unblended masks are paired with four pieces of color data stored in the color buffers 101-1 to 101-4 such that a total of eight color data and subpixel mask sets are fed to the integration/selection circuit 105 which will next be described (step S24 of FIG. 10).

Then the integration/selection circuit 105 is a circuit which performs integration and comparison processings for the eight pieces of color data and eight subpixel masks which are entered into this circuit, to select four color data and subpixel mask sets. The thus selected four color data and subpixel mask sets are fed to the color buffer 101-1 to 101-4 and the mask buffers 102-1 to 102-4 (step S25 of FIG. 10).

The integration/selection circuit 105, of which block diagram is shown in FIG. 9, includes a same-color integration circuit 201, count circuits 202-1 to 202-8 and a selection circuit 203. The respective circuits are described hereinbelow with reference to FIG. 9.

In the diagram, the same-color integration circuit 201 is a circuit which compares eight pieces of color data of the eight color data and subpixel mask sets entered and which if the same color data is present, performs a combining of the subpixel masks corresponding thereto (processing executing the bitwise logical or) for the integration into a single color data and subpixel mask set. As a result of this, the remaining color data and subpixel mask sets are fed to the next step.

For example, if three of eight pieces of color data are the same color data, then three color data and subpixel mask sets will be regarded as a single color data and subpixel mask set, with the result that six color data and subpixel mask sets are provided as output (step S251 of FIG. 10).

Then the count circuits 202-1 to 202-8 are circuits serving to count the number of valid subpixels, of sets of color data and subpixels output from the same-color integration circuit 201 and deliver the number to the selection circuit 203 which follows. The number of valid subpixels refers to the number (which is 16 at maximum in this apparatus) of subpixels having a value "1" within a subpixel mask. The increased number means that a color corresponding to that subpixel mask occupies a wider area within a pixel. In other words, that color has a higher level of contribution.

Then the selection circuit 203 is a circuit serving to compare the sets of color data and subpixel masks output from the same-color integration circuit 201 with one another, in terms of the number of subpixels output from the count circuits 202-1 to 202-8, and select four in descending order. Then the thus selected four color data and subpixel mask sets are fed to said color buffers 101-1 to 101-4 and to the mask buffers 102-1 to 102-4 (step S252 of FIG. 10). As set forth above, the values of the color buffers 101-1 to 101-4 and the mask buffers 102-1 to 102-4 are updated based on the thus output four color data and subpixel mask values (step S3 of FIG. 10).

Referring again to FIG. 11, the processing effected in this circuit will be described by way of example. It will be noted that this example assumes the case where eight pieces of color data entered into the integration/selection circuit 105 are different from one another. In the diagram, M11 and M18 denote eight subpixel masks entered into the integration/selection circuit 105, with the numerals located at the upper right of their respective subpixel masks representing the number of valid subpixels counted by the count circuits 202-1 to 202-8. The selection circuit 203 selects M11, M12, M14 and M15 having a larger number and makes them output subpixel masks M21 to M24 to the mask buffers 102-1 to 102-4.

Every time one piece of pixel data is entered into this blending unit, there are performed the processing (step S2 of FIG. 10) effected by the circuits including from the color combining circuits 103-1 to 103-4 to the selection circuit 203 and the processing (step S3 of FIG. 10) for updating the values of the color buffers 101-4 to 104-4 and the mask buffers 102-1 to 102-4, which processings have been described above and are iterated until no valid pixel data becomes present for that pixel (step S4 of FIG. 10).

Referring back to FIG. 7, the weighting average circuit 106 is a circuit serving to subject four color data and subpixel mask sets entered to weighting depending on the areas occupied by the respective colors (the number of valid subpixels of corresponding subpixel masks) to blend the respective color data, thereby determining the pixel color. As set forth above, when no valid pixel data has finally become present for that pixel (upon the completion of step S4 of FIG. 10), there are entered four color data and subpixel mask sets output from the color buffers 101-1 to 101-4 and the mask buffers 102-1 to 102-4 so that the final color of that pixel is determined (step S6 of FIG. 10). The thus determined color is written to the frame buffer 11 (step S7 of FIG. 10).

The processings effected in the respective circuits of this blending circuit as set forth hereinabove are made for all the valid pixels to thereby create one frame image displayed on the screen.

Use of the above-described blending circuit allows a subpixel based, high-quality antialiasing. Provision of the plurality of color buffers and processing circuits ensures a processing speed equal to that of the pixel based processing.

Figure 12:
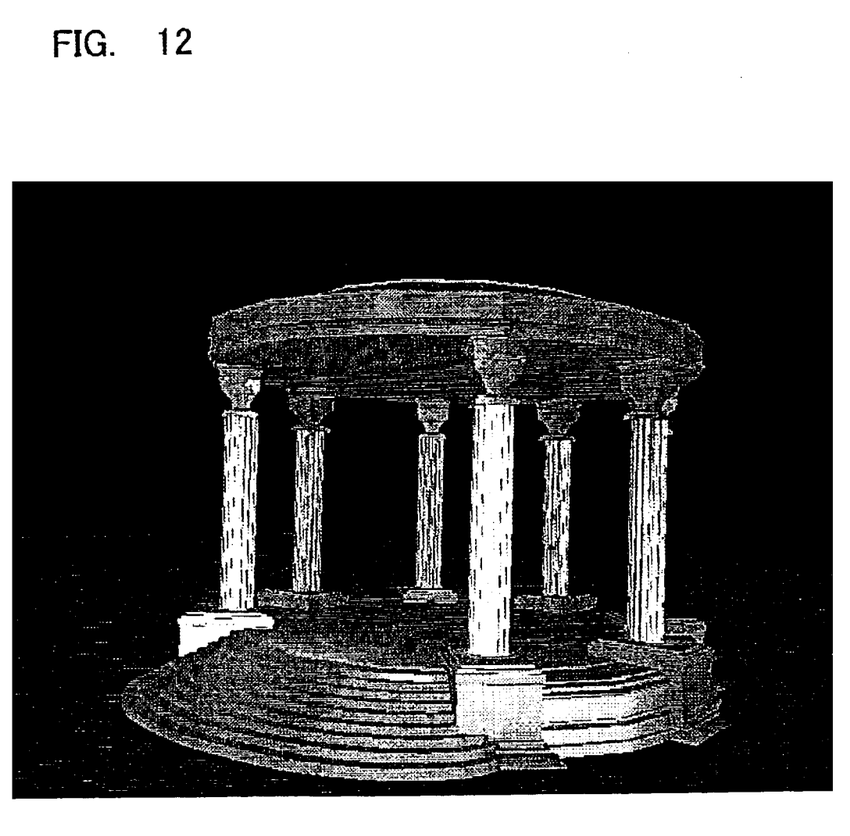
FIG. 12 illustrates an example of display free from any antialiasing processing.
Figure 13:
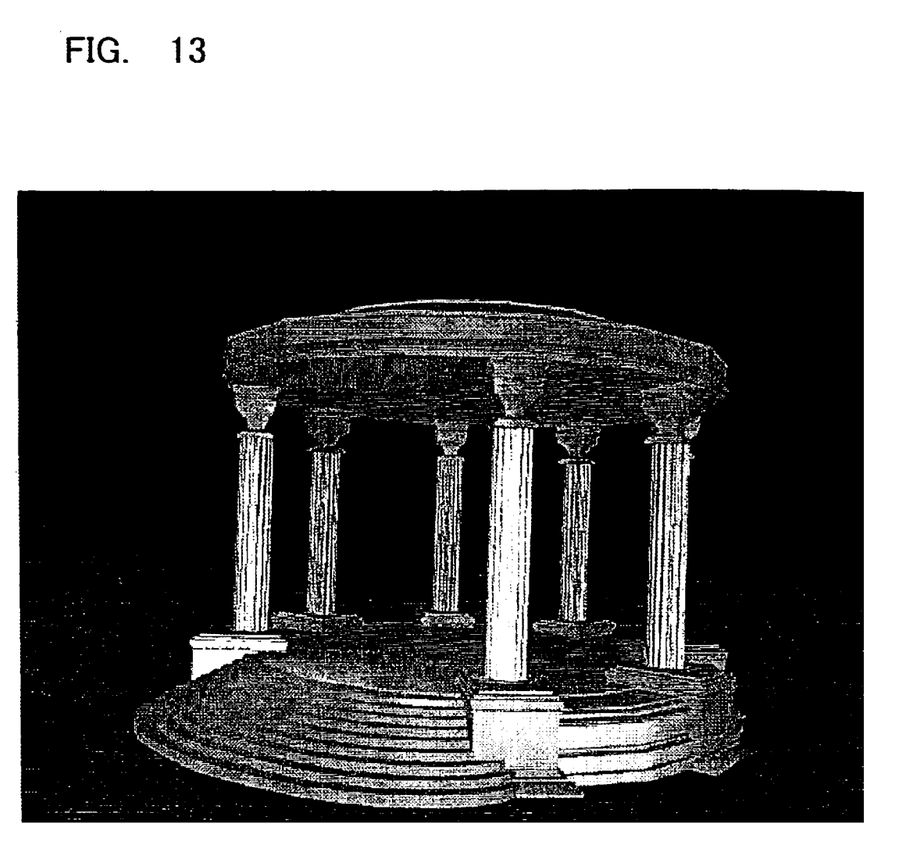
FIG. 13 illustrates an example of display obtained when subjected to the antialiasing processing in accordance with the present invention.

Furthermore, due to the number of the color buffers and the processing circuits restricted to four, it is possible to suppress any increase in the apparatus scale for obtaining a high quality and to obtain a quality substantially equivalent to the case of the oversampling method. As an example of images created, FIG. 12 shows an image free from any antialiasing processing and FIG. 13 shows an image obtained when subjected to the processing of this embodiment.

In case of using 4×4 subpixels assumed in this embodiment, a 16-times (4×4) circuit scale is normally required for the execution of the subpixel based antialiasing. The apparatus of this embodiment can however realize the same level of quality by means of four-times circuit scale as discussed hereinabove, achieving a four (16/4)-times efficiency. Moreover, use of this apparatus in case of 16×16 subpixels will achieve a 64 (16×16/4)-times efficiency. Thus, the present invention will become more efficient accordingly as the number of subpixels increases.

Although the apparatus of this embodiment has comprised four color buffers, mask buffers and processing circuits in terms of the increase of the circuit scale and the antialiasing effect obtained, the present invention is not intended to restrict the number thereof to four but it will suffice that the number is less than the number of subpixels.

The apparatus of this embodiment as set forth hereinabove achieves a high-quality antialiasing processing merely by partially altering the hidden-surface processing, the rendering process and blending process without any significant change of the conventional circuit configuration.

It will be appreciated that the above embodiment based on the accompanying drawings is provided only for the understanding of the present invention and that the scope of protection of the present invention is not restricted thereby. The scope of protection of the present invention is defined by the appended claims and any scope equivalent to the claims is also construed to fall under the scope of protection of the present invention.

As the embodiment has been set forth hereinabove with reference to the drawings, the present invention makes use of subpixel masks on a pixel-by-pixel basis for the antialiasing processing such that the blending processing for the determination of the pixel color is made in parallel by means of a less number of circuits than the number of subpixels. The subpixel masks are created by use of the hidden-surface processing based on the scanning-line three-dimensional sorting method. Furthermore, the texture mapping and shading processings are made on the pixel-by-pixel basis as in the conventional manner.

Accordingly, the present invention has an effect that subpixel based, high-quality antialiasing processing is effectively made without any remarkable increase in the processing time and without any remarkable modification or enlargement of the apparatus scale.

What is claimed is:

1. An antialiasing method for use in an image processing apparatus for displaying plural pieces of polygon data having three-dimensional coordinates, in the form of digital images, on a two-dimensional display screen, said method comprising the steps of:

creating subpixel masks as patterns of a plurality of subpixels corresponding to regions of a pixel occupied by polygons;

causing each of plural pieces of pixel data constituting each polygon data to contain said subpixel mask corresponding thereto; and determining a display color on a pixel-by-pixel basis, based on data sets consisting of said subpixel masks and color data contained in said pixel data, wherein said step of determining a display color on a pixel-by-pixel basis includes;

determining data sets consisting of n-pieces of final color data, with n being less than the number of subpixels constituting one pixel, and n final subpixel masks representative of regions which said final color data occupies within one pixel, with n being less than the number of subpixels constituting one pixel, from said data sets consisting of said subpixel masks and color data; and combining said determined data sets consisting of n-pieces of final color data and n final subpixel masks with one another.

2. An antialiasing method according to claim 1, wherein said step of determining data sets consisting of n-pieces of final color data and n final subpixel masks includes:

a first step of performing predetermined processing between a set of entered color data and entered subpixel mask values contained in one of plural pieces of pixel data which is valid for a subject pixel, and n-sets of buffer color data and buffer mask values, respectively, to newly create n-sets of color data and subpixel masks;

a second step of substituting said n-sets of buffer color data and buffer mask values with said newly created n-sets of color data and subpixel mask values, respectively;

a third step of iterating, for said subject pixel, said first step and said second step until said pixel data which is valid for said subject pixel becomes absent; and a fourth step of making said n-sets of buffer color data and buffer mask values upon the completion of said third step into values of said n-pieces of final color data and n-final subpixel masks.

3. An antialiasing method according to claim 2, wherein said first step includes:
- a color combining step for combining values of said n-pieces of buffer color data with a value of said entered color data, respectively; to newly create n-pieces of new color data;
- a mask combining step for making a logical operation between each of said n buffer masks and said entered subpixel mask, respectively, to newly create 2n new subpixel masks; and
- an integration/selection step for determining n data sets in descending order starting from one including color data occupying the largest area within a pixel, from new 2n color data and subpixel mask data sets which consist of 2n pieces of color data obtained by combining said n pieces of buffer color data with said n-pieces of new color data and of said 2n new subpixel masks.

4. An antialiasing method according to claim 3, wherein said color combining step and said mask combining step include simultaneously performing n computing processes required for respective steps.

5. An antialiasing method according to claim 3, wherein said mask combining step includes executing the bitwise logical and between each of said buffer masks and said entered subpixel mask, and the bitwise logical and between each of said buffer masks and an inverted mask for said entered subpixel mask, to thereby create two new subpixel masks for one said buffer mask.

6. An antialiasing method according to claim 3, wherein said integration/selection step includes:
- an integration step for, in case of presence of subpixel masks having the same corresponding color data among said 2n subpixel masks created in said mask combining step, executing the bitwise logical or between said subpixel masks having the same corresponding color data, for the integration into one subpixel mask; and
- a selection step for selecting n subpixel masks and color data corresponding thereto from among subpixel masks remaining after said integration step, in descending order starting from a subpixel mask occupying the largest area within a pixel.

7. An antialiasing method according to claim 1, wherein said step of combining n-pieces of final color data with n final subpixel masks includes:
- in accordance with the proportion of the area which said final subpixel masks occupy within a pixel, weighting said final color data values corresponding thereto and averaging the results.

8. An antialiasing method for use in an image processing apparatus for displaying plural pieces of polygon data having three-dimensional coordinates, in the form of digital images, on a two-dimensional display screen, said method comprising the steps of:
- creating subpixel masks as patterns of a plurality of subpixels corresponding to regions of a pixel occupied by polygons;
- causing each of plural pieces of pixel data constituting each polygon data to contain said subpixel mask corresponding thereto; and
- determining a display color on a pixel-by-pixel basis, based on data sets consisting of said subpixel masks and color data contained in said pixel data;
- wherein said subpixel masks are created by
  - a hidden-surface processing step which includes, for each of scanning lines constituting said display screen, sorting a plurality of polygons whose edges intersect each scanning line, based on specific positions of said polygons in X-axis direction of said scanning lines, and further sorting said sorted polygons on the basis of Z-coordinate values of said polygons, said hidden-surface processing being performed on said subpixel basis; and by
  - a step of making the results of said hidden-surface processing into said pixel based data.

9. An antialiasing method according to claim 8, wherein said subpixel based hidden-surface processing includes:
- a Y-sorting step for segmenting, into each scanning line, polygons converted into two-dimensional data corresponding to said display screen;
- a subline segmenting step for segmenting said polygons segmented into each of said scanning lines in said Y-sorting step, into a plurality of sublines having a width equal to the height of said subpixel, said sublines extending parallel to said scanning lines;
- an X-sorting step for sorting, for each subline, said polygons segmented into sublines in said subline segmenting step using X-coordinate values which represent specific positions of said polygons in X-axis direction by the width of said subpixel; and
- a Z-sorting step for sorting, for each subline, said polygons sorted in said X-sorting step using Z-coordinate values of said polygons, to determine sites to simultaneously be displayed, by the width of said subpixel; and wherein
  said step of making the results of said hidden-surface processing into said pixel based data includes:
  - a subline queuing/pixel making step for integrating, for each polygon, said subline based display sites determined in said Z-sorting step, to perform a re-segmentation thereof on said pixel basis.

10. An antialiasing method according to claim 9, wherein said plurality of sublines lying within one scanning line are subjected simultaneously to said X-sorting step and said Z-sorting step in their respective steps.

11. An antialiasing method according to claim 1, further comprising texture mapping and shading steps performed on a pixel-by-pixel basis.

12. An image processing apparatus for displaying as digital images plural pieces of polygon data having three-dimensional coordinates, on a two-dimensional display screen, said apparatus comprising:
- a subpixel mask creating unit which creates subpixel masks as patterns of a plurality of subpixels corresponding to regions in pixels occupied by polygons and causes each of plural pieces of pixel data constituting each polygon data to contain said subpixel mask corresponding to said each of plural pieces of pixel data; and
- a blending unit which determines a display color on a pixel-by-pixel basis, based on data sets consisting of said subpixel masks and any color contained in said pixel data;
- wherein said blending unit includes:
  - n color buffers and n mask buffers, with n being less than the number of subpixels making up one pixel;
  - a processing unit which from data sets consisting of subpixel masks and color data both contained in said pixel data, determines n-pieces of final color data and n final subpixel masks representative of regions occupied by said final color data in a pixel, said processing unit storing said determined final color data and final subpixel masks in said color buffers and said mask buffers; and a combining circuit which combines said n-pieces of final color data with said n final subpixel masks to thereby determine a display color of said pixel.

13. An image processing apparatus according to claim 12, wherein said processing unit includes;
n color combining circuits which combine color data stored in each color buffer with color data contained in each pixel data which is valid for said subject pixel, to create one piece of new color data for each color buffer;
n mask combining circuits which execute logical operation between buffer mask stored in each mask buffer and entered subpixel mask contained in each pixel data which is valid for said subject pixel, to create two new subpixel masks for each mask buffer; and
an integration/selection circuit which from new 2n color data and subpixel mask data sets consisting of 2n-pieces of color data obtained by combining n-pieces of color data stored in said color buffers with n new color data created in said color combining circuits, and of 2n new subpixel masks created in said mask combining circuit, determines n data sets in descending order starting from one including color data occupying the largest area within a pixel, said integration/selection circuit writing said data sets back to said color buffers and said mask buffers.

14. An image processing apparatus according to claim 13, wherein said mask combining circuit executes the bitwise logical and between said buffer mask and said entered subpixel mask, and the bitwise logical and between said buffer mask and an inverted mask for said entered subpixel mask, to thereby create two new subpixel masks for each buffer mask.

15. An image processing apparatus according to claim 13, wherein said integration/selection circuit includes;
a same-color integration circuit which, in case of presence of subpixel masks having the same corresponding color data among said 2n subpixel masks created in said mask combining circuits, executes the bitwise logical or between said subpixel masks having the same corresponding color data, for the integration into one subpixel mask;
a count circuit for counting the number of valid subpixels, of subpixel masks remaining after the processing effected in said same-color integration circuit; and
a selection circuit for selecting n subpixel masks and color data corresponding thereto in descending order starting from a subpixel mask in which the number of valid subpixels obtained in said count circuit is largest.

16. An image processing apparatus according to claim 12, wherein said combining circuit is a weighting average circuit which depending on the proportion of the area occupied by said final subpixel masks in a pixel, weights corresponding said final color data values to average the results.

17. An image processing apparatus for displaying as digital images plural pieces of polygon data having three-dimensional coordinates, on a two-dimensional display screen, said apparatus comprising:

a subpixel mask creating unit which creates subpixel masks as patterns of a plurality of subpixels corresponding to regions in pixels occupied by polygons and causes each of plural pieces of pixel data constituting each polygon data to contain said subpixel mask corresponding to said each of plural pieces of pixel data data; and a blending unit which determines a display color on a pixel-by-pixel basis, based, based on data sets consisting of said subpixel masks and any color contained in said pixel data;

wherein said subpixel mask creating unit includes:
a hidden-surface processing unit for performing hidden-surface processing on said subpixel basis, said hidden-surface processing including, for each of scanning lines constituting said display screen, sorting a plurality of polygons whose edges intersect each scanning line, based on specific positions of said polygons in X-axis direction of said scanning lines, and further sorting said sorted polygons on the basis of Z-coordinate values of said polygons; and
a rendering unit for making the results of processing effected by said hidden-surface processing unit into said pixel based data.

18. An image processing apparatus according to claim 17, wherein said hidden-surface processing unit includes;
Y sorters for segmenting, into each scanning line, polygons converted into two-dimensional data corresponding to said display screen;
a subline segmenting unit for segmenting said polygons segmented into each of said scanning lines, into a plurality of sublines having a width equal to the height of said subpixel, said sublines extending parallel to said scanning lines;
X sorters for sorting, for each subline, said polygons segmented into sublines using X-coordinate values which represent specific positions of said polygons in X-axis direction by the width of said subpixel, the number of said X sorters being equal to the number of sublines lying within each scanning line; and
Z sorters for sorting, for each subline, said polygons sorted in said X sorters using Z-coordinate values of said polygons, to output sites to simultaneously be displayed, by the width of said subpixel, the number of Z sorters being equal to the number of said X sorters; and wherein
said rendering unit includes:
a subline queuing/pixel making unit for integrating, for each polygon, said subline based display sites created in said Z sorters, to perform a re-segmentation thereof on said pixel basis.

19. An image processing apparatus according to claim 12, further comprising, between said subpixel mask creating unit and said blending unit:

a texture unit for performing a texture mapping process on said pixel basis; and a shading unit for performing a shading process on said pixel basis.

* * * * *